United States Patent [19]
Hammer et al.

[11] Patent Number: 6,064,152
[45] Date of Patent: May 16, 2000

[54] ELECTRICALLY CONDUCTIVE CYLINDER FOR IMPROVED STARTING OF COMPACT FLUORESCENT LAMP SYSTEMS

[75] Inventors: Edward E. Hammer, Mayfield Village; Alvin A. Bush, South Euclid, both of Ohio

[73] Assignee: General Electric Company, Schenectady, N.Y.

[21] Appl. No.: 09/098,608

[22] Filed: Jun. 17, 1998

[51] Int. Cl.[7] .................................................. H01J 1/50
[52] U.S. Cl. ........................... 313/580; 313/313; 313/352
[58] Field of Search ................................. 313/580, 313, 313/352

[56] References Cited

U.S. PATENT DOCUMENTS

| | | |
|---|---|---|
| 4,445,074 | 4/1984 | Watanabe . |
| 4,484,108 | 11/1984 | Stupp et al. . |
| 4,546,290 | 10/1985 | Kerekes . |
| 4,588,925 | 5/1986 | Fähnrich et al. . |
| 5,023,516 | 6/1991 | Ito et al. . |
| 5,138,235 | 8/1992 | Sun et al. . |
| 5,262,699 | 11/1993 | Sun et al. . |
| 5,512,799 | 4/1996 | Waymouth . |
| 5,703,440 | 12/1997 | Kachmarik et al. . |

*Primary Examiner*—Vip Patel
*Attorney, Agent, or Firm*—Fay, Sharpe, Fagan, Minnich & McKee, LLP

[57] ABSTRACT

A compact fluorescent lamp system includes a housing and an external base connector mounted in the housing. The external base connector receives electrical power from an external source. A ballast unit is secured within the housing and is electrically connected to the external base connector. The ballast unit controls the electrical power received from the external source. A lamp unit defines an interior volume. The lamp unit includes first and second lamp electrodes extending into the lamp unit. The lamp unit contains a gas which breaks-down permitting electrical current to pass through the lamp unit. An interior of the lamp unit is coated with a material which fluoresces when the gas within the sealed lamp unit ionizes. An electrically conductive hollow cylinder is located within the interior volume. A breakdown voltage path within the lamp unit is modified by the electrically conductive hollow cylinder.

19 Claims, 7 Drawing Sheets

ELECTRICALLY CONDUCTIVE CYLINDER FOR IMPROVED STARTING OF COMPACT FLUORESCENT LAMP SYSTEMS

BACKGROUND OF THE INVENTION

The present invention relates to compact fluorescent lamp systems. It finds particular application in conjunction with starting compact fluorescent lamp systems having high frequency electronic ballast units and will be described with particular reference thereto. It will be appreciated, however, that the invention will also find application in starting other lamp systems.

Many compact fluorescent lamp systems include a sealed, gas-filled lamp having multiple fingers. A gas filling of Argon at approximately 3 Torr coupled with a sufficient quantity of mercury, for example, is commonly used. An inner wall of the lamp is coated with a material (e.g., a mixture of phosphors) which fluoresces when it is excited by ultra-violet radiation generated by the ionized mercury vapor.

The fingers of a compact fluorescent lamp are typically formed from several shaped tubes. Bridges (i.e., passageways) connect all but two ends of adjacent tubes thereby forming a lamp having a hexagonal-shaped or octagonal-shaped geometry. Lamp electrodes are sealed into the unconnected adjacent ends. Each lamp electrode provides an electrical path into the lamp. Input connection leads from a high-frequency ballast unit are secured to the lamp electrodes.

When a starting voltage is delivered from the ballast unit to the conducting electrodes, that voltage is transferred into the discharge space of the lamp via the lamp electrodes. The starting voltage creates electromagnetic fields within the lamp which create a breakdown voltage path and a current within the tubes. The voltage potential within the tubes breaks-down (i.e., ionizes) the gas. Once the mercury atoms are ionized, and a threshold number of ions are produced, the lamp will start and the coating material within the lamp begins to fluoresce.

In its initial state, the gas within the lamp presents a high impedance to the ballast. Therefore, the starting voltage supplied by the ballast must be high enough to overcome this impedance and create an ionized gas capable of supplying the necessary current to operate the lamp. Supplying a starting voltage capable of ionizing enough gas to start the lamp, however, can produce an undesirable side-effect. More specifically, if the two lamp electrodes are in close proximity to one another, a higher starting voltage may occur due to a capacitive breakdown path between the tubes containing the lamp electrodes. When this occurs, not enough discharge current travels within the lamp tubes to start the lamp. These capacitive breakdown paths between the lamp electrodes most often occur when high frequency (e.g., greater than 20 kHz) electronic ballast units are used to control the power supplied to the lamp.

One way to start the compact fluorescent lamp when capacitive displacement current exists between the lamp electrodes is to increase the starting voltage delivered by the ballast unit. Although the displacement current created by the increased starting voltage still exists between the lamp electrodes, more discharge current travels through the lamp tube, thereby permitting the ionized gas to start the lamp. Supplying higher starting voltages to the lamp assembly, however, is undesirable for various reasons. For example, these higher voltages may cause additional voltage stresses on the ballast components which, in turn, require more expensive components to withstand these higher starting voltage requirements.

The present invention provides a new and improved apparatus and method which overcomes the above-referenced problems and others.

SUMMARY OF THE INVENTION

A fluorescent lamp system includes a ballast unit, a sealed lamp unit which substantially surrounds a volume of space, first and second lamp electrodes located at respective end points of the lamp unit, and an electrically conductive material located within the volume of space surrounded by the lamp unit. The ballast unit controls electrical power received from an external power source. The sealed lamp unit is secured to the ballast unit and contains a gas. The first and second lamp electrodes extend into the sealed lamp unit and are electrically connected to the ballast unit. Electric fields are created within the sealed lamp unit when electrical power is supplied to the first and second lamp electrodes. A breakdown voltage path within the sealed lamp unit is modified by the electrically conductive material.

In accordance with one aspect of the invention, the electrically conductive material contacts the sealed lamp unit.

In accordance with another aspect of the invention, the sealed lamp unit is multi-segmented and the electrically conductive material contacts at least one of the segments.

In accordance with a more limited aspect of the invention, the electrically conductive material forms a substantially cylindrical shape which is substantially hollow.

In accordance with another aspect of the invention, the electrically conductive material includes a conductive foil.

One advantage of the present invention is that the breakdown voltage potential is distributed more evenly across the lamp, thereby reducing the voltage requirement to actually start the lamp.

Another advantage of the present invention is that a lower voltage is required to start the fluorescent lamp system.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
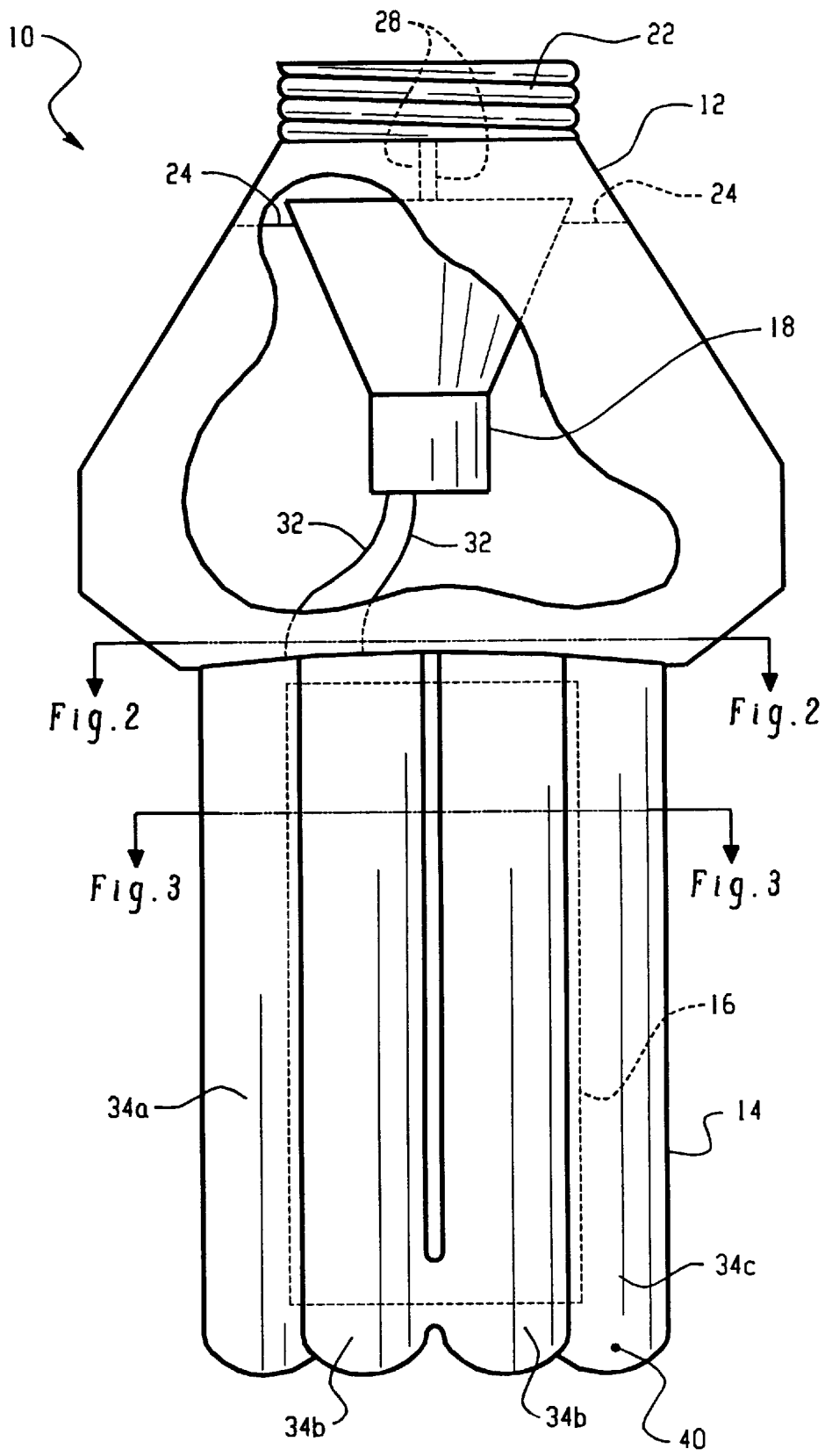
FIG. 1 is a front view of an integral compact fluorescent lamp system according to the present invention.

FIG. 1 illustrates an integral compact fluorescent lamp system 10. The compact fluorescent lamp system 10 includes a housing 12 and an integral type lamp assembly 14. The lamp assembly 14 is preferably configured to define a substantially circular area. An electrically conductive hollow cylinder 16 is contained within the circular area of the lamp assembly 14. The hollow cylinder 16 is preferably ungrounded. However, it is also contemplated that the cylinder be connected to a ground.

The housing 12 includes a ballast unit 18 and a connection base 22. Fasteners 24 secure the ballast unit 18 to the housing 12. Preferably, the ballast unit is a high-frequency, electronic ballast unit and the fasteners 24 include plastic segments which protrude from the walls of the housing 12 and attach to the ballast unit 18. However, it is to be understood that other ballast units and other types of fasteners are also contemplated. The connection base 22 is preferably an Edison base as used in threaded incandescent sockets. However, it is also contemplated that the connection base be a pin base, as used in a linear fluorescent lamp, or a bayonet-type base. Wires 28 provide an electrical connection between the connection base 22 and the ballast unit 18.

Figure 2:
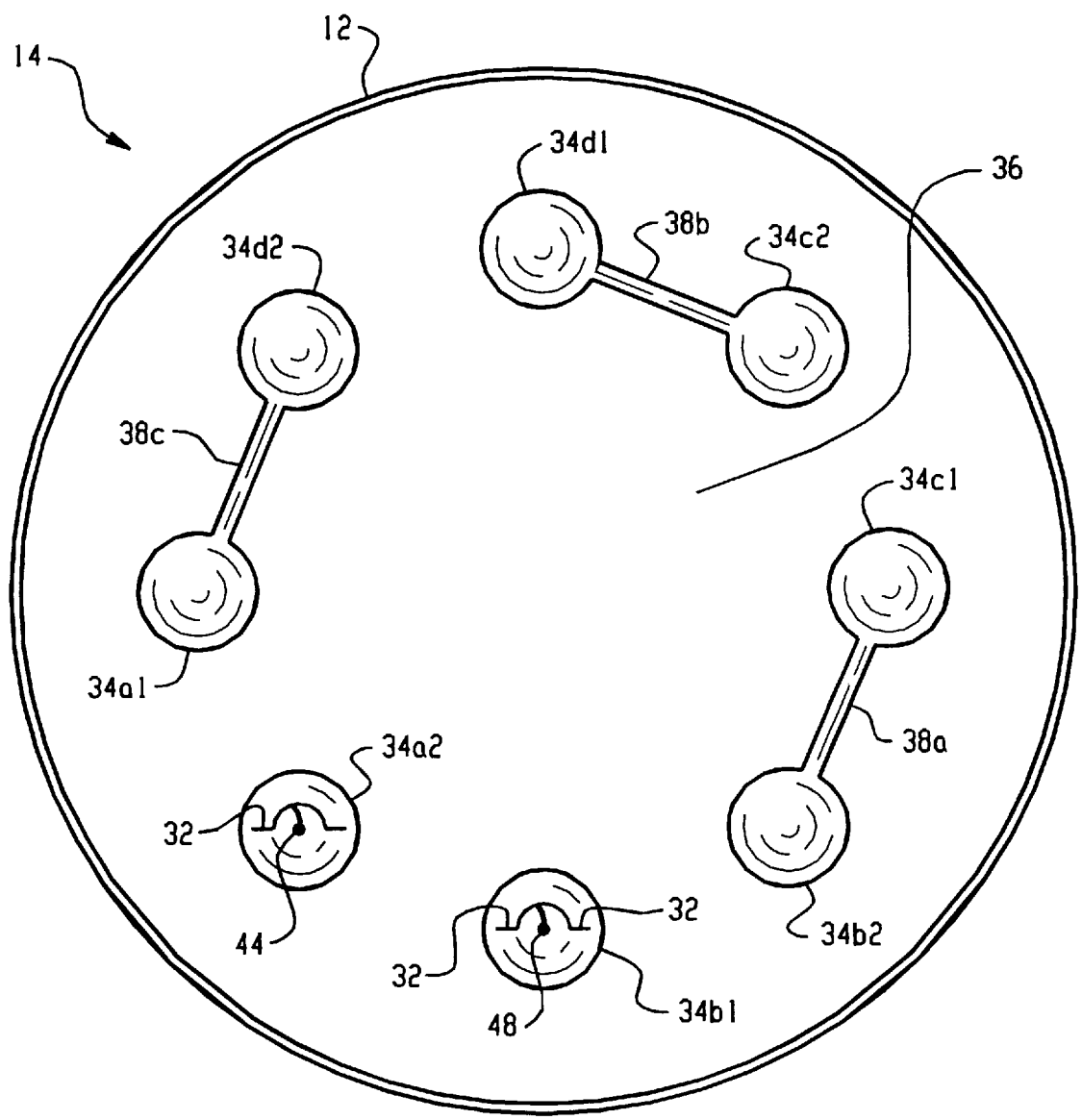
FIG. 2 is a cross-sectional view of the integral compact fluorescent lamp system taken along the line indicated in FIG. 1.

With reference to FIGS. 1 and 2, the lamp assembly 14 is connected to the ballast unit 18 through electrical connections 32. The lamp assembly 14 in the preferred embodiment includes four lamp tubes 34a, 34b, 34c, 34d which are configured to surround a volume of space 36. Each tube is preferably bent into a U-shape. However, other embodiments having different numbers of tubes configured into different shapes are also contemplated. The lamp tube 34a includes tube ends 34a1, 34a2. Similarly, the lamp tubes 34b, 34c, 34d include be ends 34b1, 34b2; 34c1, 34c2; and 34d1, 34d2, respectively.

The adjacent ends 32b2, 32c1; 32c2, 32d1; and 32d2, 32a1 of the lamp tubes 32a, 32b, 32c, 32d are connected by bridges (i.e., passageways) 38a, 38b, 38c, respectively. More specifically, a bridge 38a connects the adjacent ends 34b2, 34c1 of lamp tubes 34b, 34c, respectively. Similarly, a bridge 38b connects the adjacent ends 34c2, 34d1 of lamp tubes 34c, 34d, respectively, and a bridge 38c connects the adjacent ends 34d2, 34a1 of lamp tubes 34d, 34a, respectively. The adjacent tube ends 34a2, 34b1, which are not connected by a bridge, are sealed. One of the tubes 34c optionally contains an amalgam ball pellet 40.

First and second lamp electrodes 44, 48 are inserted into respective tube ends 34a2, 34b1. Each lamp electrode 44, 48 includes two metal wires. The lamp electrodes 44, 48 extend into respective tube ends 34a2, 34b1. The electrodes 44, 48 also provide external electrical connection points into respective tube ends 34a2, 34b1.

In the preferred embodiment, an inert gas with a sufficient quantity of mercury is contained within the sealed tubes 34a, 34b, 34c, 34d and bridges 38a, 38b, 38c. Also, the inner wall of each tube 34a, 34b, 34c, 34d is coated with a material (e.g., a mixture of phosphors) which fluoresces when it is excited with ultra-violet radiation produced when the mercury atoms within the lamp assembly 14 are ionized.

During use, electrical power enters the compact fluorescent lamp system 10 through the connection base 22 and is passed to the ballast unit 18 through the wires 28. The ballast unit 18 controls the electrical power received from the connection base 22 and delivers the controlled electrical power to the first and second lamp electrodes 44, 48, respectively, via the electrical connections 32. Once electrical power is supplied to the lamp electrodes 44, 48, electric fields are created within the lamp assembly 14. The electrically conductive hollow cylinder 16 adds additional electrical field points along the path within the lamp assembly 14, thereby modifying the breakdown path of the electrical field. Therefore, the initial breakdown path is more intimately related to the electrically conductive hollow cylinder 16 during the starting process. The modified breakdown path of the electrical field permits a current to flow between the lamp electrodes 44, 48 within the lamp assembly 14. The current can flow when the gas within the lamp breaks-down (i.e., ionizes), causing the lamp to start.

As described above, the electrically conductive hollow cylinder acts to distribute the voltage supplied by the ballast unit 18 more evenly along the breakdown path within the tubes 34a, 34b, 34c, 34d. Therefore, the voltage potential between the first and second lamp electrodes 44, 48, respectively, is extended to additional points within the discharge space. In fact, the voltage potential between the lamp electrodes 44, 48 is reduced such that the probability of the displacement current shorting between the electrodes 44, 48, even when the ballast unit 18 delivers a starting voltage of 500 V rms, is greatly reduced. The capacitive coupling between the lamp electrodes 44, 48 does not occur despite the fact that the electrodes 44, 48 are located in close proximity to one another. Because the displacement current shorts do not occur between the electrodes 44, 48, the lamp tubes 38a, 38b, 38c have a lower starting voltage requirement. Therefore, a sufficient amount of current is delivered along the path inside the tubes 38a, 38b, 38c to start the lamp assembly 14.

Figure 3:
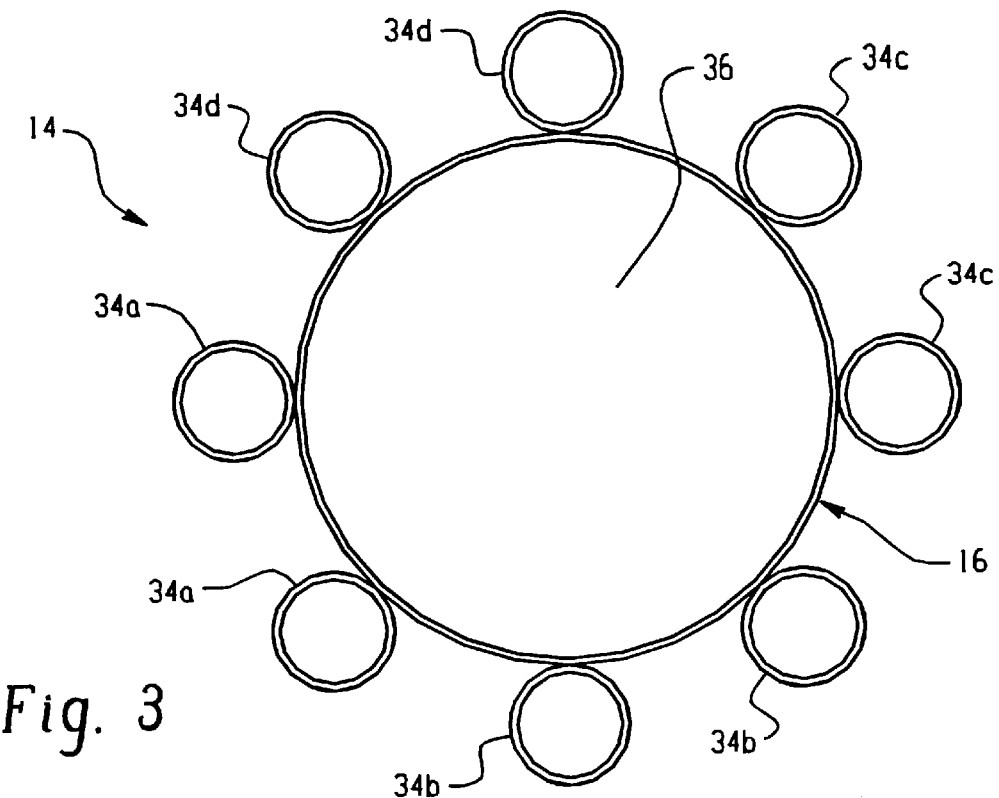
FIG. 3 is a cross-sectional view of the integral lamp assembly taken along the line indicated in FIG. 1.

With reference to FIG. 3, the hollow cylinder 16 preferably contacts all of the tubes 34a, 34b, 34c, 34d. However, it is to be understood that embodiments in which the cylinder 16 contacts fewer than all the tubes, or even none of the tubes, are also contemplated. In these alternate embodiments, one end of the hollow cylinder is secured to the base of the lamp assembly.

Figure 4:
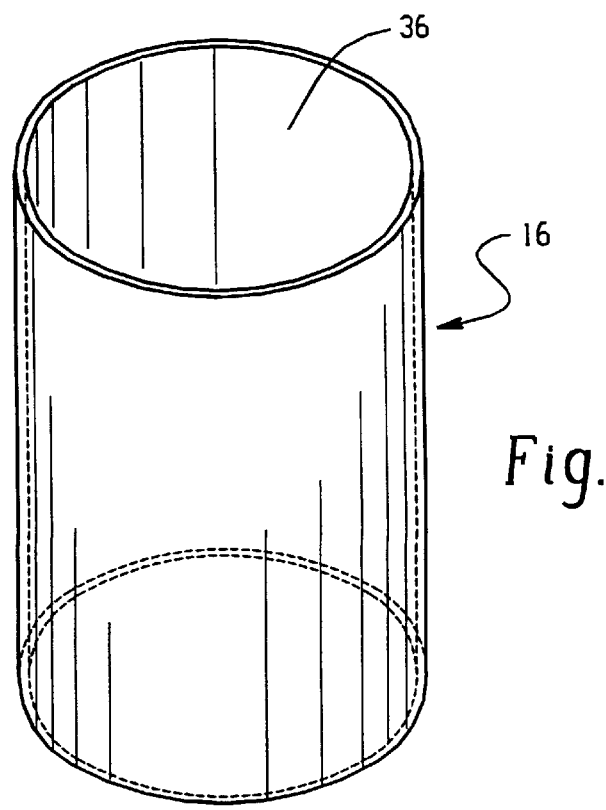
FIG. 4 is a perspective view of the hollow cylinder disclosed in the present invention.

FIG. 4 illustrates a perspective view of the electrically conductive hollow cylinder 16. Preferably, the cylinder 16 is a conductive foil type element and is about 0.03 inches thick. However, other conductive materials and dimensions are also contemplated.

Figure 5:
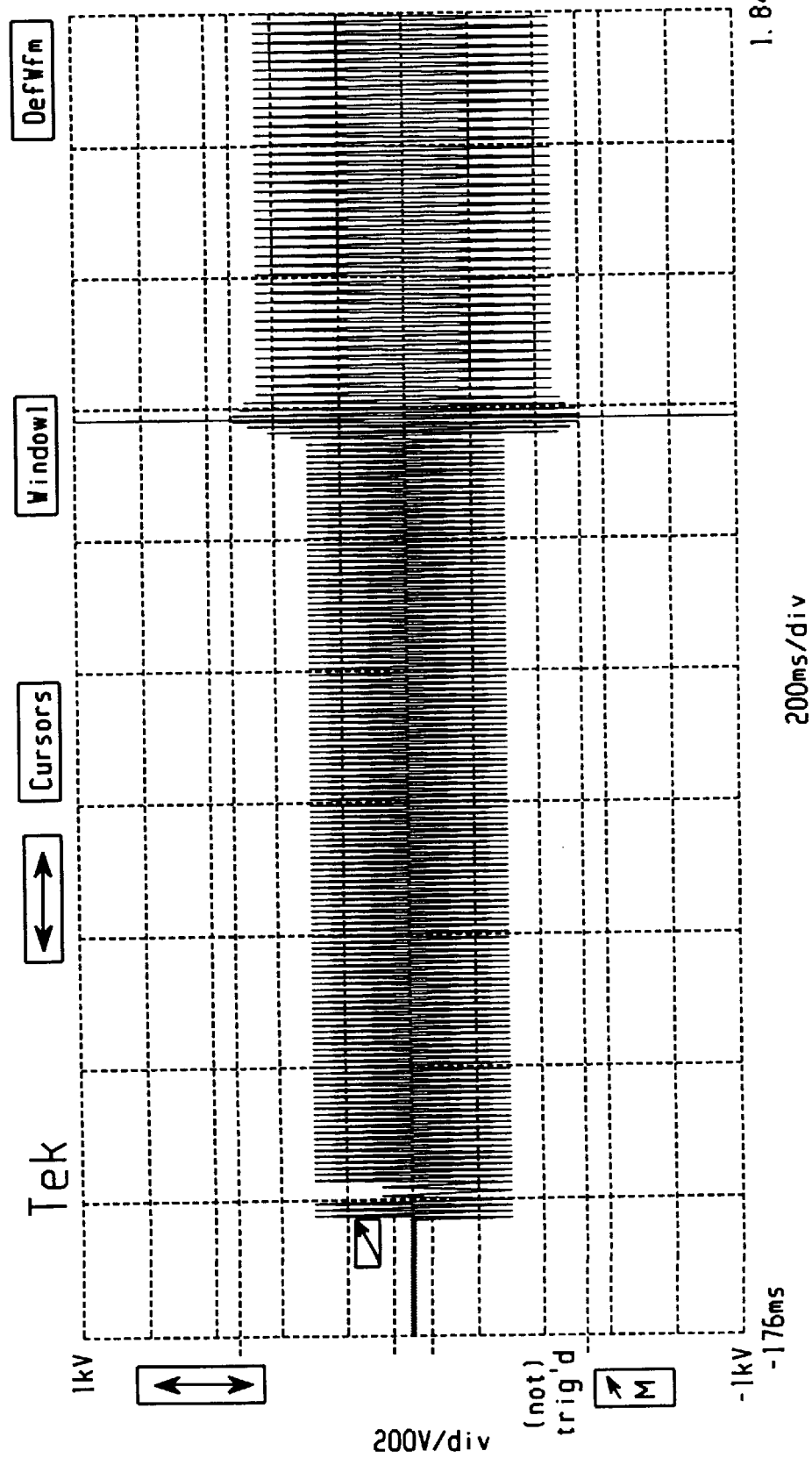
FIG. 5 illustrates a graph showing a lamp start voltage versus time in a lamp without the electrically conductive hollow cylinder disclosed in the present invention.
Figure 6:
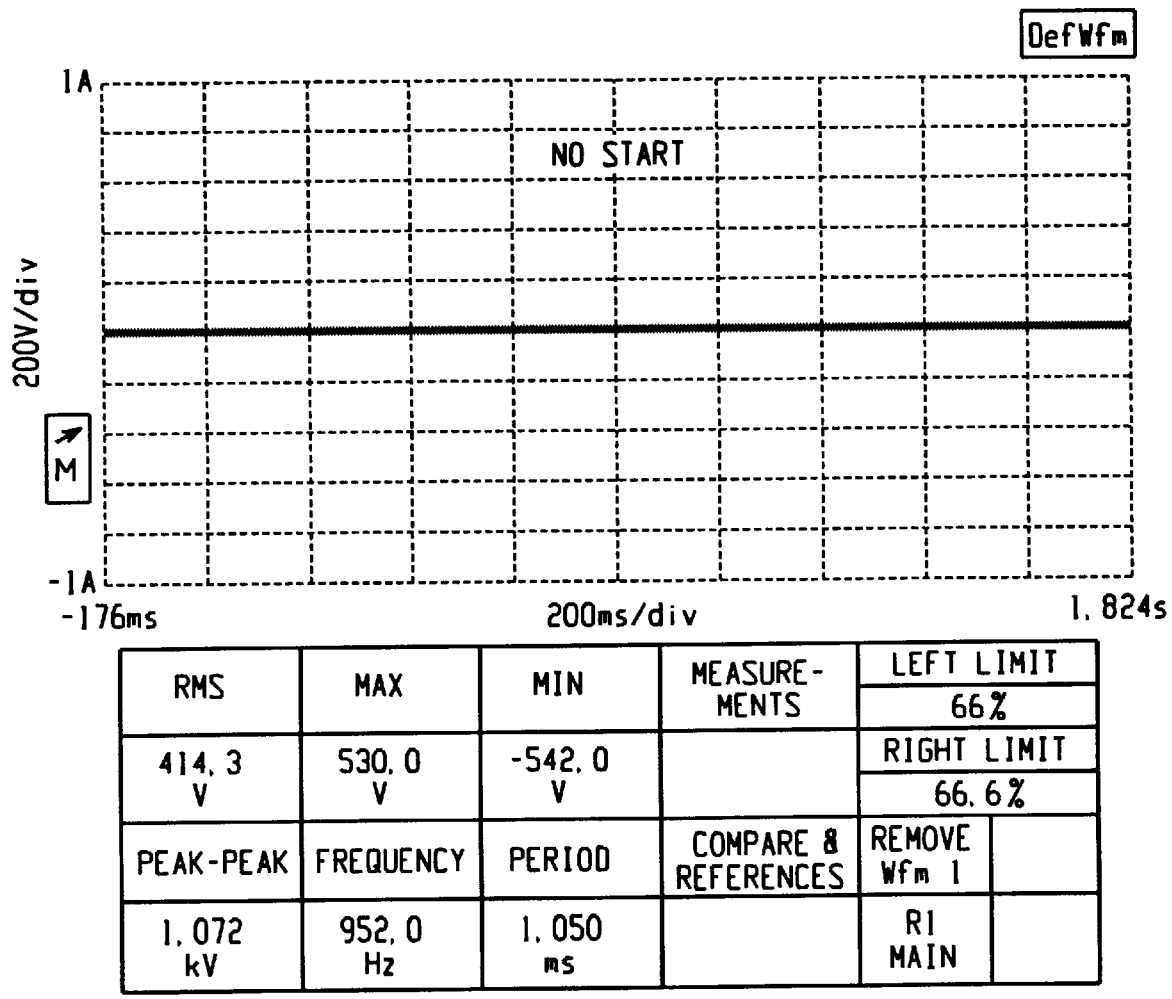
FIG. 6 illustrates a graph showing the unsatisfactory lamp start current for the lamp which generated the graph shown in FIG. 5.

FIG. 5 illustrates a graph showing a lamp start voltage versus time in a lamp without the electrically conductive hollow cylinder disclosed in the present invention. FIG. 6 illustrates a graph showing the lamp start current for the same lamp. FIG. 6 shows the lamp start current is zero (0) even when a starting voltage of 400 V rms is applied. In other words, FIG. 6 shows the lamp without the electrically conductive hollow cylinder of the present invention never starts.

Figure 7:
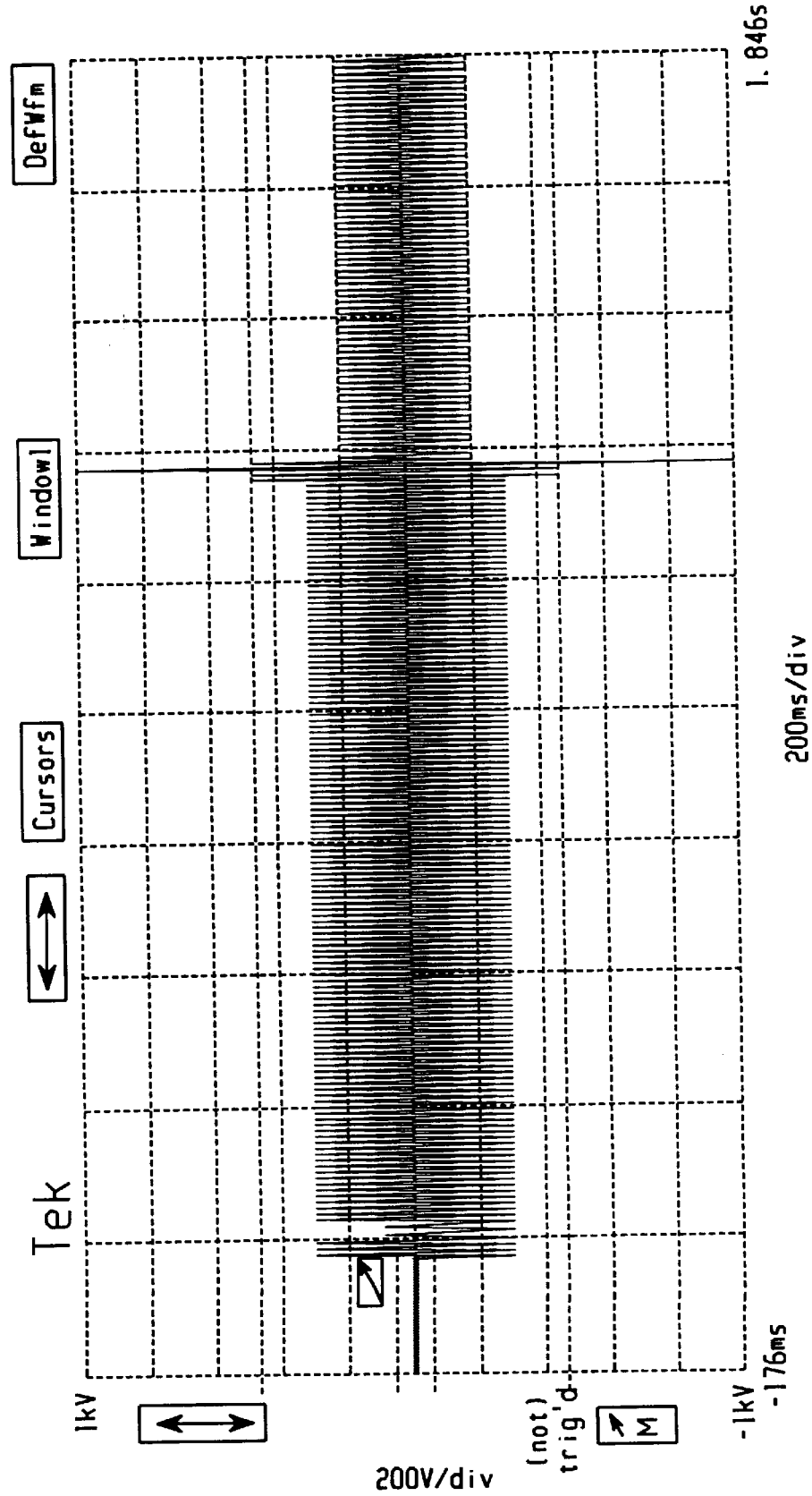
FIG. 7 illustrates a graph showing a lamp start voltage versus time in a lamp having the electrically conductive hollow cylinder disclosed in the present invention.
Figure 8:
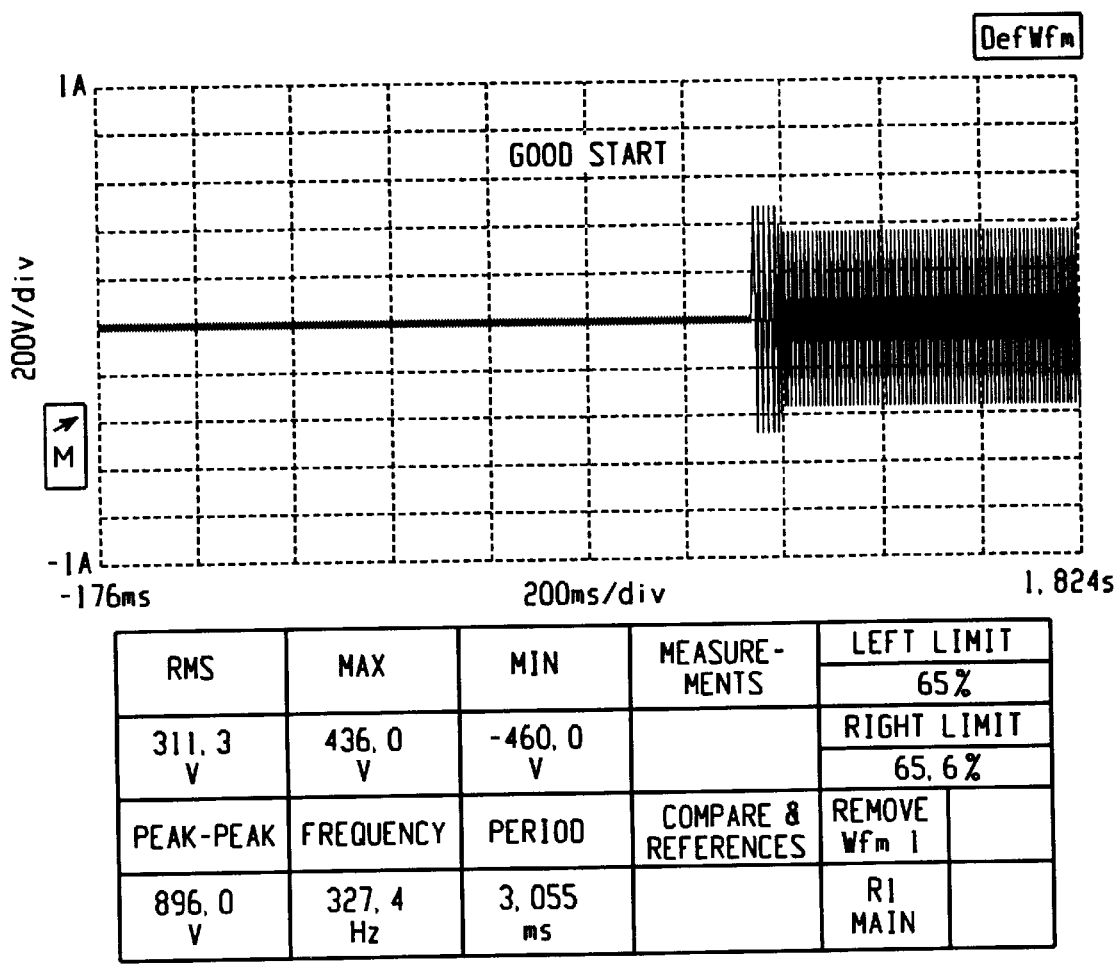
FIG. 8 illustrates a graph showing the satisfactory lamp start current for the lamp which rated the graph shown in FIG. 7.

FIG. 7 illustrates a graph showing a lamp start voltage versus time in a lamp having the electrically conductive hollow cylinder disclosed in the present invention. FIG. 8 illustrates a graph showing the lamp start current for the same lamp. FIG. 8 shows the lamp start current jumps from zero (0) to almost 400 mA when less than 400 V rms is applied (i.e., when the lamp starts). Therefore, a comparison between FIG. 6 and FIG. 8 shows the lamp without the electrically conductive hollow cylinder of the present invention fails to start whereas the lamp having the electrically conductive hollow cylinder as disclosed in the present invention starts when less than 400 V rms is applied.

The preferred embodiment discloses the electrically conductive hollow cylinder utilized within an integral compact fluorescent lamp system. However, it is also contemplated that the electrically conductive hollow cylinder be utilized within a plug-in type lamp assembly.

The invention has been described with reference to several embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A fluorescent lamp system, comprising:

a ballast unit which controls electrical power received from an external power source;

a sealed lamp unit secured to the ballast unit, the sealed lamp unit containing a gas and substantially surrounding a volume of space;

first and second lamp electrodes located at respective end points of the lamp unit, the electrodes extending into the sealed lamp unit and being electrically connected to the ballast unit, electric fields being created within the sealed lamp unit when electrical power is supplied to the first and second lamp electrodes; and an electrically conductive material located within the volume of space surrounded by the sealed lamp unit, a breakdown voltage path within the sealed lamp unit being modified by the electrically conductive material.

2. The fluorescent lamp system as set forth in claim 1, wherein the electrically conductive material contacts the sealed lamp unit.

3. The fluorescent lamp system as set forth in claim 2, wherein the sealed lamp unit is multi-segmented, the electrically conductive material contacting at least one of the segments.

4. The fluorescent lamp system as set forth in claim 3, wherein the two lamp electrodes are located in adjacent segments.

5. The fluorescent lamp system as set forth in claim 3, wherein the sealed lamp includes eight segments.

6. The fluorescent lamp system as set forth in claim 2, wherein one of the segments contains an amalgam ball pellet.

7. The fluorescent lamp system as set forth in claim 1, wherein the electrically conductive material includes a conductive foil.

8. The fluorescent lamp system as set forth in claim 2, wherein:

the electrically conductive material forms a substantially cylindrical shape which is substantially hollow; and the electrically conductive material creates additional electric fields within the sealed lamp unit, the additional electric fields modifying the breakdown voltage path within the sealed lamp unit.

9. The fluorescent lamp system as set forth in claim 1, wherein:

the gas is an inert gas; and the sealed lamp unit contains a mercury.

10. A lamp unit for a compact fluorescent lamp system, the lamp unit being configured to surround an interior volume, comprising:

first and second lamp electrodes extending into the lamp unit, the lamp unit containing a gas which breaks-down when an electrical voltage potential is created within the lamp unit, an interior of the lamp unit being coated with a material which fluoresces when the gas within the sealed lamp unit breaks-down; and an electrically conductive material located within the interior volume, a breakdown voltage path within the lamp unit being modified by the electrically conductive material.

11. The lamp unit as set forth in claim 10, wherein the electrically conductive material includes a conductive foil.

12. The lamp unit as set forth in claim 10, wherein:

the lamp unit includes a plurality of segments;

the first and second lamp electrodes are located in first and second segments of the sealed lamp unit, the first and second segments being adjacent to one another; and the electrically conductive material contacts at least one of the segments.

13. The lamp unit as set forth in claim 12, wherein:

the electrically conductive material forms a substantially cylindrical shape which is substantially hollow; and the interior volume is substantially cylindrical, the electrically conductive material being sized to fit within the interior volume.

14. The lamp unit as set forth in claim 12, wherein the lamp unit includes eight segments.

15. The lamp unit as set forth in claim 12, further including an amalgam ball pellet positioned in one of the segments of the lamp unit.

16. A compact fluorescent lamp system, comprising:

a housing;

an external base connector mounted in the housing, the external base connector receiving electrical power from an external source;

a ballast unit secured within the housing and electrically connected to the external base connector, the ballast unit controlling the electrical power received from the external source; and a lamp unit defining an interior volume, the lamp unit including:

first and second lamp electrodes extending into the lamp unit, the lamp unit containing a gas which breaks-down permitting electrical current to pass through the lamp unit, an interior of the lamp unit being coated with a material which fluoresces when the gas within the sealed lamp unit ionizes; and an electrically conductive hollow cylinder located within the interior volume, a breakdown voltage path within the lamp unit being modified by the electrically conductive hollow cylinder.

17. The compact fluorescent lamp system as set forth in claim 16, wherein:

the lamp unit is substantially circular; and the lamp unit includes a plurality of segments, the first and second lamp electrodes being located in adjacent segments.

18. The compact fluorescent lamp system as set forth in claim 17, wherein the ballast unit is an electronic ballast unit operating at a frequency above about 20 kHz.

19. The compact fluorescent lamp system as set forth in claim 18, wherein the lamp unit is an integral type lamp unit.

* * * * *